(12) United States Patent
Gao et al.

(10) Patent No.: US 11,838,940 B2
(45) Date of Patent: Dec. 5, 2023

(54) METHOD FOR DETERMINING WORKING FREQUENCY POINT, UNMANNED AERIAL VEHICLE, REMOTE CONTROL, UNMANNED AERIAL VEHICLE SYSTEM AND COMPUTER STORAGE MEDIUM

(71) Applicant: SANECHIPS TECHNOLOGY CO., LTD., Shenzhen (CN)

(72) Inventors: Zhuhong Gao, Shenzhen (CN); Guolong Peng, Shenzhen (CN); Wenping Fang, Shenzhen (CN); Longhui Tang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 231 days.

(21) Appl. No.: 17/299,466

(22) PCT Filed: Dec. 5, 2019

(86) PCT No.: PCT/CN2019/123380
§ 371 (c)(1),
(2) Date: Jun. 3, 2021

(87) PCT Pub. No.: WO2020/119577
PCT Pub. Date: Jun. 18, 2020

(65) Prior Publication Data
US 2022/0030600 A1 Jan. 27, 2022

(30) Foreign Application Priority Data
Dec. 14, 2018 (CN) .......................... 201811535082.4

(51) Int. Cl.
*H04L 12/26* (2006.01)
*H04W 72/542* (2023.01)
(Continued)

(52) U.S. Cl.
CPC ........ *H04W 72/542* (2023.01); *G05D 1/0022* (2013.01); *H04B 17/318* (2015.01);
(Continued)

(58) Field of Classification Search
CPC ............. H04W 72/542; H04W 72/044; H04W 72/1263; H04W 36/165; H04W 72/541;
(Continued)

(56) References Cited

U.S. PATENT DOCUMENTS

| | | | | |
|---|---|---|---|---|
| 6,006,089 | A | * 12/1999 | Sasaki | .................. H04B 17/318 455/457 |
| 2002/0037088 | A1 | * 3/2002 | Dickel | ................. H04R 25/407 381/317 |

(Continued)

FOREIGN PATENT DOCUMENTS

| | | |
|---|---|---|
| CN | 101656980 A | 2/2010 |
| CN | 101778412 A | 7/2010 |

(Continued)

OTHER PUBLICATIONS

International Search Report for corresponding application PCT/CN2019/123380 filed Dec. 5, 2019; dated Feb. 25, 2020.

*Primary Examiner* — Phuongchau Ba Nguyen
(74) *Attorney, Agent, or Firm* — CANTOR COLBURN LLP

(57) ABSTRACT

A method for determining a working frequency point includes: each measurement period and each frequency point to be measured in each measurement period are acquired; whether a present moment is a first scheduling slice of a present measurement period is judged; if YES, frequency point switching and measurement are sequentially performed to obtain a Received Signal Strength Indication (RSSI) value of each frequency point to be measured in the present measurement period, frequency point switching
(Continued)

back to a present working frequency point is performed, and the judging is re-executed until an RSSI value of each frequency point to be measured in each measurement period is measured; if NO, the judging is re-executed; and a working frequency point is redetermined according to a relationship between the RSSI value of each frequency point to be measured in each measurement period and an interference value of the present working frequency point.

19 Claims, 6 Drawing Sheets

(51) Int. Cl.
*H04B 17/318* (2015.01)
*H04B 17/345* (2015.01)
*G05D 1/00* (2006.01)
*H04W 72/044* (2023.01)
*H04W 72/1263* (2023.01)

(52) U.S. Cl.
CPC ........ *H04B 17/345* (2015.01); *H04W 72/044* (2013.01); *H04W 72/1263* (2013.01)

(58) Field of Classification Search
CPC . H04W 36/20; H04W 36/0083; H04W 36/26; H04W 36/30; G05D 1/0022; H04B 17/318; H04B 17/345; H04B 17/26; H04Q 2213/13204; H04Q 11/045; H04L 43/50; H04L 12/2602; H04L 12/2697
See application file for complete search history.

(56) References Cited

U.S. PATENT DOCUMENTS

| | | | |
|---|---|---|---|
| 2006/0217097 A1* | 9/2006 | Nakagawa | H04B 17/23 455/67.11 |
| 2007/0076783 A1 | 4/2007 | Dishman | |
| 2010/0029232 A1* | 2/2010 | Kursawe | H04B 17/318 455/161.3 |
| 2011/0096679 A1* | 4/2011 | Hayashino | H04W 72/541 370/252 |
| 2015/0130971 A1* | 5/2015 | Oike | H04N 25/60 348/241 |
| 2015/0148039 A1 | 5/2015 | Yang | |
| 2022/0086741 A1* | 3/2022 | Liao | H04W 4/50 |
| 2023/0112482 A1* | 4/2023 | Stockert | G06Q 50/18 707/822 |

FOREIGN PATENT DOCUMENTS

| | | | | |
|---|---|---|---|---|
| CN | 106559152 A | 4/2017 | | |
| CN | 108390748 A | 8/2018 | | |
| EP | 2854325 B1 | 4/2014 | | |
| EP | 3897037 A1 * | 10/2021 | ......... | G05D 1/0022 |
| WO | 2010061096 A1 | 6/2010 | | |

* cited by examiner

METHOD FOR DETERMINING WORKING FREQUENCY POINT, UNMANNED AERIAL VEHICLE, REMOTE CONTROL, UNMANNED AERIAL VEHICLE SYSTEM AND COMPUTER STORAGE MEDIUM

CROSS REFERENCE

This application is a National Stage Filing of the PCT International Application No. PCT/CN2019/123380 filed on Dec. 5, 2019, which claims priority to Chinese Application No. 201811535082.4 filed on Dec. 14, 2018, the entirety of which is herein incorporated by reference.

TECHNICAL FIELD

The present disclosure relates to interference measurement technologies for unmanned aerial vehicles, and particularly to a method for determining a working frequency point, an unmanned aerial vehicle, a remote control, an unmanned aerial vehicle system and a computer storage medium.

BACKGROUND

Unmanned aerial vehicle, as an epoch-making high-end technical product integrating a communication technology, a sensor technology, an intelligent control technology and an information processing technology, refers to a system including a ground remote control that remotely operates an aircraft in the air by radio. Unmanned aerial vehicles have been applied in daily life, such as aerial photography, firefighting, sowing through unmanned aerial vehicles, remote sensing surveying and mapping, the military field and the like.

At present, domestic and international mainstream unmanned aerial vehicle systems mainly work in frequency bands of 2.4G and 900M, and the two frequency bands are multiplexed with Wireless-Fidelity (WIFI) and the Global System for Mobile communications (GSM) respectively. In the present social environment, WIFI/GSM signals are everywhere, and interferences are inevitably brought to frequency bands where unmanned aerial vehicles work, so that how to detect and avoid interferences accurately has become very important. Whether interferences are detected timely and accurately or not is an important indicator for measuring the image transmission performance and flight distance of an unmanned aerial vehicle system.

According to an existing interference measurement method for an unmanned aerial vehicle, the unmanned aerial vehicle and a remote control can measure only one frequency point to be measured in each measurement period. In such case, relatively long time is required to complete measuring all frequency points, and the frequency point corresponding to an interference minimum may not be determined timely. Consequently, the measurement accuracy is relatively low, and the interference measurement efficiency is low. It can be seen that there exists such a technical problem that the interference measurement efficiency of an unmanned aerial vehicle system is relatively low at present.

SUMMARY

In view of this, embodiments of the present disclosure provide a method for determining a working frequency point, an unmanned aerial vehicle, a remote control, an unmanned aerial vehicle system and a computer storage medium. The interference measurement efficiency of an unmanned aerial vehicle system may be improved.

Technical solutions of the embodiments of the present disclosure are implemented as follows.

According to a first aspect, the embodiments of the present disclosure provide a method for determining a working frequency point, which may be applied to an unmanned aerial vehicle or a remote control in an unmanned aerial vehicle system and include the following operations.

In a case where both the unmanned aerial vehicle and the remote control are in a working state after being time-synchronized, each measurement period and each frequency point to be measured in each measurement period are acquired, wherein each measurement period includes m scheduling slices, the scheduling slice is a moment for measuring each frequency point to be measured corresponding to each measurement period, and m is a positive integer.

It is judged whether a present moment is a first scheduling slice of a present measurement period or not.

In a case where the present moment is the first scheduling slice of the present measurement period, frequency point switching and measurement are sequentially performed according to each frequency point to be measured in the present measurement period to obtain a Received Signal Strength Indication (RSSI) value of each frequency point to be measured in the present measurement period.

Frequency point switching back to a present working frequency point is performed, and the operation of judging whether the present moment is the first scheduling slice of the present measurement period or not is re-executed until an RSSI value of each frequency point to be measured in each measurement period is measured.

In a case where the present moment is not the first scheduling slice of the present measurement period, the operation of judging whether the present moment is the first scheduling slice of the present measurement period or not is re-executed.

A working frequency point is redetermined according to a relationship between the RSSI value of each frequency point to be measured in each measurement period and an interference value of the present working frequency point.

In the solution, the operation that frequency point switching and measurement are sequentially performed according to each frequency point to be measured in the present measurement period to obtain the RSSI value of each frequency point to be measured in the present measurement period may include that:

frequency point switching and measurement are sequentially performed according to each frequency point to be measured in the present measurement period to obtain an RSSI value of each subcarrier in each 1M bandwidth range corresponding to each frequency point to be measured in the present measurement period; and the RSSI value of each subcarrier in each 1M bandwidth range corresponding to each frequency point to be measured in the present measurement period is accumulated to obtain the RSSI value of each frequency point to be measured in the present measurement period.

In the solution, the operation that the working frequency point is redetermined according to the relationship between the RSSI value of each frequency point to be measured in each measurement period and the interference value of the present working frequency point may include that:

a system bandwidth is acquired;

group-based averaging is sequentially performed on the RSSI value of each frequency point to be measured in each measurement period according to the system bandwidth to obtain an average in each group of system bandwidth range;

Automatic Gain Control (AGC) recovery is performed on the average in each group of system bandwidth range, and the average in each group of system bandwidth range after AGC recovery is determined as an interference value of a center frequency point in each group of system bandwidth range;

a minimum interference value is selected from the interference value of the center frequency point in each group of system bandwidth range; and the working frequency point is redetermined according to a relationship between the minimum interference value and the interference value of the present working frequency point.

In the solution, the operation that the working frequency point is redetermined according to the relationship between the minimum interference value and the interference value of the present working frequency point may include that:

it is judged whether the present working frequency point is the center frequency point corresponding to the minimum interference value or not;

in a case where the present working frequency point is the center frequency point corresponding to the minimum interference value, it is judged whether the interference value of the present working frequency point is greater than a sum of the minimum interference value and a first preset threshold or not;

in a case where the interference value of the present working frequency point is greater than the sum of the minimum interference value and the first preset threshold, the center frequency point corresponding to the minimum interference value is determined as a new working frequency point; and in a case where the present working frequency point is not the center frequency point corresponding to the minimum interference value and/or in a case where the interference value of the present working frequency point is less than or equal to the sum of the minimum interference value and the first preset threshold, the working frequency point is redetermined according to a noise parameter of the present working frequency point.

In the solution, the operation that the working frequency point is redetermined according to the noise parameter of the present working frequency point may include that:

it is judged whether a Signal-Noise Ratio (SNR) of the present working frequency point is less than a second preset threshold or not;

in a case where the SNR of the present working frequency point is less than the second preset threshold, it is judged whether a noise of the present working frequency point is greater than the sum of the minimum interference value and the first preset threshold or not, and the center frequency point corresponding to the minimum interference value is determined as the new working frequency point;

in a case where the SNR of the present working frequency point is more than or equal to the second preset threshold, the present working frequency point is maintained; and in a case where the noise of the present working frequency point is less than or equal to the sum of the minimum interference value and the first preset threshold, the present working frequency point is maintained.

According to a second aspect, the embodiments of the present disclosure also provide an unmanned aerial vehicle, which may be arranged in an unmanned aerial vehicle system, the unmanned aerial vehicle system further including a remote control, the unmanned aerial vehicle including:

a first acquisition module, configured to, in a case where both the unmanned aerial vehicle and the remote control are in a working state after being time-synchronized, acquire each measurement period and each frequency point to be measured in each measurement period, wherein each measurement period includes m scheduling slices, the scheduling slice is a moment for measuring each frequency point to be measured corresponding to each measurement period, and m is a positive integer;

a first judgment module, configured to judge whether a present moment is a first scheduling slice of a present measurement period or not;

a first measurement module, configured to, in a case where the present moment is the first scheduling slice of the present measurement period, sequentially perform frequency point switching and measurement according to each frequency point to be measured in the present measurement period to obtain an RSSI value of each frequency point to be measured in the present measurement period;

a first re-executing module, configured to perform frequency point switching back to a present working frequency point and re-execute the operation of judging whether the present moment is the first scheduling slice of the present measurement period or not until an RSSI value of each frequency point to be measured in each measurement period is measured;

a second re-executing module, configured to, in a case where the present moment is not the first scheduling slice of the present measurement period, re-execute the operation of judging whether the present moment is the first scheduling slice of the present measurement period or not; and a first determination module, configured to redetermine a working frequency point according to a relationship between the RSSI value of each frequency point to be measured in each measurement period and an interference value of the present working frequency point.

In the unmanned aerial vehicle, the first measurement module, when sequentially performing frequency point switching and measurement according to each frequency point to be measured in the present measurement period to obtain the RSSI value of each frequency point to be measured in the present measurement period, is configured to:

sequentially perform frequency point switching and measurement according to each frequency point to be measured in the present measurement period to obtain an RSSI value of each subcarrier in each 1M bandwidth range corresponding to each frequency point to be measured in the present measurement period; and accumulate the RSSI value of each subcarrier in each 1M bandwidth range corresponding to each frequency point to be measured in the present measurement period to obtain the RSSI value of each frequency point to be measured in the present measurement period.

In the unmanned aerial vehicle, the first determination module includes:

a first acquisition submodule, configured to acquire a system bandwidth;

a first calculation submodule, configured to sequentially perform group-based averaging on the RSSI value of each frequency point to be measured in each measurement period according to the system bandwidth to obtain an average in each group of system bandwidth range;

a first determination submodule, configured to perform AGC recovery on the average in each group of system bandwidth range and determine the average in each group of system bandwidth range after AGC recovery as an interference value of a center frequency point in each group of system bandwidth range;

a first selection submodule, configured to select a minimum interference value from the interference value of the center frequency point in each group of system bandwidth range; and a first redetermination submodule, configured to redetermine the working frequency point according to a relationship between the minimum interference value and the interference value of the present working frequency point.

In the unmanned aerial vehicle, the first redetermination submodule is configured to:

judge whether the present working frequency point is the center frequency point corresponding to the minimum interference value or not;

in a case where the present working frequency point is the center frequency point corresponding to the minimum interference value, judge whether the interference value of the present working frequency point is greater than a sum of the minimum interference value and a first preset threshold or not;

in a case where the interference value of the present working frequency point is greater than the sum of the minimum interference value and the first preset threshold, determine the center frequency point corresponding to the minimum interference value as a new working frequency point; and in a case where the present working frequency point is not the center frequency point corresponding to the minimum interference value and/or in a case where the interference value of the present working frequency point is less than or equal to the sum of the minimum interference value and the first preset threshold, redetermine the working frequency point according to a noise parameter of the present working frequency point.

In the unmanned aerial vehicle, the first redetermination submodule, when redetermining the working frequency point according to the noise parameter of the present working frequency point, is configured to:

judge whether an SNR of the present working frequency point is less than a second preset threshold or not;

in a case where the SNR of the present working frequency point is less than the second preset threshold, judge whether a noise of the present working frequency point is greater than the sum of the minimum interference value and the first preset threshold or not and determine the center frequency point corresponding to the minimum interference value as the new working frequency point;

in a case where the SNR of the present working frequency point is more than or equal to the second preset threshold, maintain the present working frequency point; and in a case where the noise of the present working frequency point is less than or equal to the sum of the minimum interference value and the first preset threshold, maintain the present working frequency point.

According to a third aspect, the embodiments of the present disclosure also provide a remote control, which may be arranged in an unmanned aerial vehicle system, the unmanned aerial vehicle system further including an unmanned aerial vehicle, the remote control including:

a second acquisition module, configured to, in a case where both the unmanned aerial vehicle and the remote control are in a working state after being time-synchronized, acquire each measurement period and each frequency point to be measured in each measurement period, wherein each measurement period includes m scheduling slices, the scheduling slice is a moment for measuring each frequency point to be measured corresponding to each measurement period, and m is a positive integer;

a second judgment module, configured to judge whether a present moment is a first scheduling slice of a present measurement period or not;

a second measurement module, configured to, in a case where the present moment is the first scheduling slice of the present measurement period, sequentially perform frequency point switching and measurement according to each frequency point to be measured in the present measurement period to obtain an RSSI value of each frequency point to be measured in the present measurement period;

a third re-executing module, configured to perform frequency point switching back to a present working frequency point and re-execute the operation of judging whether the present moment is the first scheduling slice of the present measurement period or not until an RSSI value of each frequency point to be measured in each measurement period is measured;

a fourth re-executing module, configured to, in a case where the present moment is not the first scheduling slice of the present measurement period, re-execute the operation of judging whether the present moment is the first scheduling slice of the present measurement period or not; and a second determination module, configured to redetermine a working frequency point according to a relationship between the RSSI value of each frequency point to be measured in each measurement period and an interference value of the present working frequency point.

In the remote control, the second measurement module, when sequentially performing frequency point switching and measurement according to each frequency point to be measured in the present measurement period to obtain the RSSI value of each frequency point to be measured in the present measurement period, is configured to:

sequentially perform frequency point switching and measurement according to each frequency point to be measured in the present measurement period to obtain an RSSI value of each subcarrier in each 1M bandwidth range corresponding to each frequency point to be measured in the present measurement period; and accumulate the RSSI value of each subcarrier in each 1M bandwidth range corresponding to each frequency point to be measured in the present measurement period to obtain the RSSI value of each frequency point to be measured in the present measurement period.

In the remote control, the second determination module includes:

a second acquisition submodule, configured to acquire a system bandwidth;

a second calculation submodule, configured to sequentially perform group-based averaging on the RSSI value of each frequency point to be measured in each measurement period according to the system bandwidth to obtain an average in each group of system bandwidth range;

a second determination submodule, configured to perform AGC recovery on the average in each group of system bandwidth range and determine the average in each group of system bandwidth range after AGC recovery as an interference value of a center frequency point in each group of system bandwidth range;

a second selection submodule, configured to select a minimum interference value from the interference value of the center frequency point in each group of system bandwidth range; and a second redetermination submodule, configured to redetermine the working frequency point according to a relationship between the minimum interference value and the interference value of the present working frequency point.

In the remote control, the second redetermination submodule is configured to:

judge whether the present working frequency point is the center frequency point corresponding to the minimum interference value or not;

in a case where the present working frequency point is the center frequency point corresponding to the minimum interference value, judge whether the interference value of the present working frequency point is greater than a sum of the minimum interference value and a first preset threshold or not;

in a case where the interference value of the present working frequency point is greater than the sum of the minimum interference value and the first preset threshold, determine the center frequency point corresponding to the minimum interference value as a new working frequency point; and in a case where the present working frequency point is not the center frequency point corresponding to the minimum interference value and/or in a case where the interference value of the present working frequency point is less than or equal to the sum of the minimum interference value and the first preset threshold, redetermine the working frequency point according to a noise parameter of the present working frequency point.

In the remote control, the second redetermination submodule, when redetermining the working frequency point according to the noise parameter of the present working frequency point, is configured to:

judge whether an SNR of the present working frequency point is less than a second preset threshold or not;

in a case where the SNR of the present working frequency point is less than the second preset threshold, judge whether a noise of the present working frequency point is greater than the sum of the minimum interference value and the first preset threshold or not and determine the center frequency point corresponding to the minimum interference value as the new working frequency point;

in a case where the SNR of the present working frequency point is more than or equal to the second preset threshold, maintain the present working frequency point; and in a case where the noise of the present working frequency point is less than or equal to the sum of the minimum interference value and the first preset threshold, maintain the present working frequency point.

According to a fourth aspect, the embodiments of the present disclosure provide an unmanned aerial vehicle, which may be arranged in an unmanned aerial vehicle system, the unmanned aerial vehicle system further including a remote control, the unmanned aerial vehicle including a processor and a storage medium storing an instruction executable for the processor, wherein the storage medium may execute an operation based on the processor through a communication bus; and the instruction may be executed by the processor to execute the method for determining the working frequency point executed by the unmanned aerial vehicle in one or more abovementioned embodiments.

According to a fifth aspect, the embodiments of the present disclosure provide a remote control, which may be arranged in an unmanned aerial vehicle system, the unmanned aerial vehicle system further including an unmanned aerial vehicle, the remote control including a processor and a storage medium storing an instruction executable for the processor, wherein the storage medium may execute an operation based on the processor through a communication bus; and the instruction may be executed by the processor to execute the method for determining the working frequency point executed by the remote control in one or more abovementioned embodiments.

According to a sixth aspect, the embodiments of the present disclosure provide an unmanned aerial vehicle system, which may include the unmanned aerial vehicle as described in one or more abovementioned embodiments and the remote control as described in one or more abovementioned embodiments.

According to a seventh aspect, the embodiments of the present disclosure provide a computer storage medium storing an executable instruction which is executed by one or more processors to enable the processor to execute the method for determining the working frequency point as described in one or more abovementioned embodiments.

The embodiments of the present disclosure provide the method for determining the working frequency point, the unmanned aerial vehicle, the remote control, the unmanned aerial vehicle system and the computer storage medium. The method is applied to the unmanned aerial vehicle or remote control of the unmanned aerial vehicle system. The method includes the following operations. At first, when both the unmanned aerial vehicle and the remote control are in the working state after being time-synchronized, each measurement period and each frequency point to be measured in each measurement period are acquired, wherein each measurement period includes the m scheduling slices, the scheduling slice being the moment configured to measure each frequency point to be measured corresponding to each measurement period, and m is a positive integer, so that the specific frequency point to be measured at specific time may be obtained. Then, it is judged whether the present moment is the first scheduling slice of the present measurement period or not. In a case where the present moment is the first scheduling slice of the present measurement period, frequency point switching and measurement are sequentially performed according to each frequency point to be measured in the present measurement period to obtain the RSSI value of each frequency point to be measured in the present measurement period, frequency point switching back to the present working frequency point is performed, and the operation of judging whether the present moment is the first scheduling slice of the present measurement period or not is re-executed until the RSSI value of each frequency point to be measured in each measurement period is measured. In a case where the present moment is not the first scheduling slice of the present measurement period, the operation of judging whether the present moment is the first scheduling slice of the present measurement period or not is re-executed, and the operations may be repeated to acquire the RSSI value of each frequency point to be measured in each measurement period. Finally, the working frequency point is redetermined according to the relationship between the RSSI value of each frequency point to be measured in each measurement period and the interference value of the present working frequency point. That is, in the embodiments of the present disclosure, the RSSI value of each frequency point to be measured in each measurement period may be obtained by measurement according to each set measurement period and each frequency point to be measured in each measurement period, namely multiple frequency points to be measured may be measured using one measurement period, which shortens interference measurement time, and furthermore, the working frequency point is redetermined according to the relationship between the RSSI value of each frequency point to be measured in each measurement period and the interference value of the present working frequency point. In such a manner, one measurement period is set to measure multiple frequency points to be measured, so that the interference measurement speed is increased, and the interference measurement efficiency of the unmanned aerial vehicle system is improved.

DETAILED DESCRIPTION OF THE EMBODIMENTS

The technical solutions in the embodiments of the present disclosure will be clearly and completely described below in combination with the drawings in the embodiments of the present disclosure.

Figure 1:
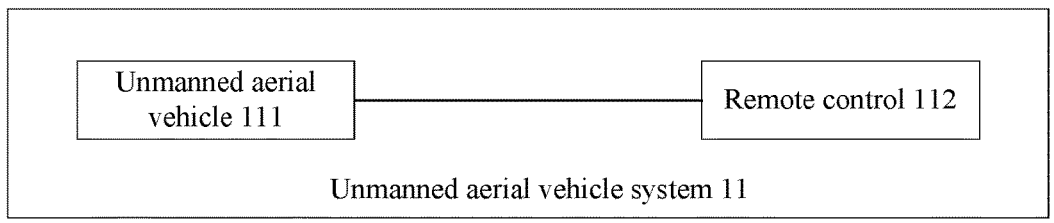
FIG. 1 is an optional structure diagram of an unmanned aerial vehicle system according to an embodiment of the present disclosure.

The embodiments of the present disclosure provide a method for determining a working frequency point, which may be applied to an unmanned aerial vehicle or remote control of an unmanned aerial vehicle system. FIG. 1 is an optional structure diagram of an unmanned aerial vehicle system according to an embodiment of the present disclosure. As shown in FIG. 1, the unmanned aerial vehicle system 11 may include an unmanned aerial vehicle 111 and a remote control 112. A communication connection is established between the unmanned aerial vehicle 111 and the remote control 112.

When both the unmanned aerial vehicle 111 and the remote control 112 are in a working state after being time-synchronized, the remote control 112 may send a control signal to the unmanned aerial vehicle 111, and the unmanned aerial vehicle 111 performs aerial photographing, firefighting, sowing through the unmanned aerial vehicle, remote sensing surveying and mapping, military reconnaissance and the like according to the received control signal and sends acquired information to the remote control 112.

Figure 2:
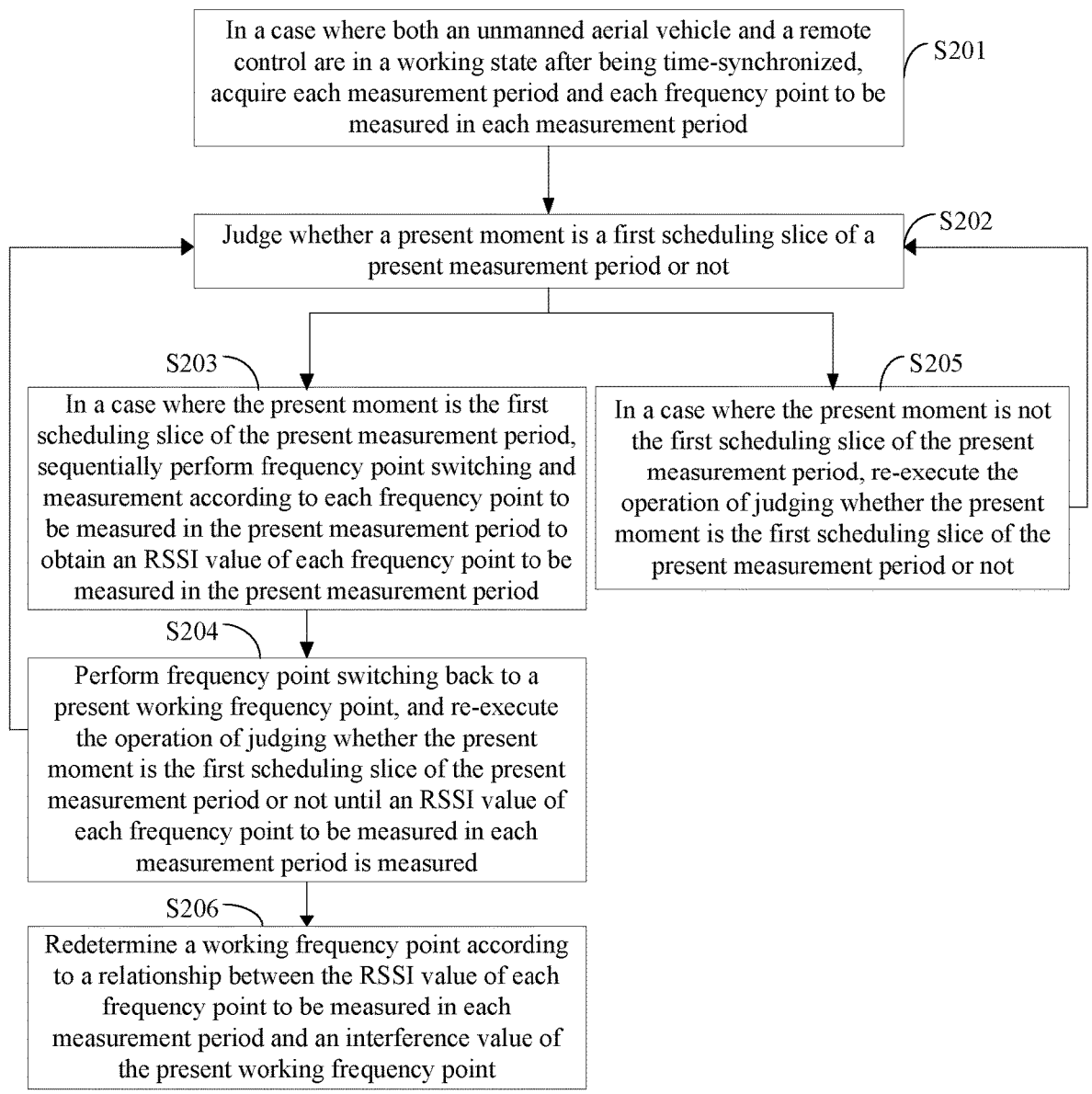
FIG. 2 is an optional flowchart of a method for determining a working frequency point according to an embodiment of the present disclosure.

FIG. 2 is an optional flowchart of a method for determining a working frequency point according to an embodiment of the present disclosure. As shown in FIG. 2, the method for determining the working frequency point may include the following operations.

In S201, in a case where both an unmanned aerial vehicle and a remote control are in a working state after being time-synchronized, each measurement period and each frequency point to be measured in each measurement period are acquired.

Herein, it is to be noted that the method for determining the working frequency point may be applied to the unmanned aerial vehicle of an unmanned aerial vehicle system and may also be applied to the remote control of the unmanned aerial vehicle system. That is, the unmanned aerial vehicle may determine a working frequency point of the unmanned aerial vehicle by the method for determining the working frequency point, and the remote control may also determine a working frequency point of the remote control by the method for determining the working frequency point.

Specifically, the unmanned aerial vehicle is taken as an example. When both the unmanned aerial vehicle and remote control of the unmanned aerial vehicle system are in the working state after being time-synchronized, each measurement period of the unmanned aerial vehicle and a frequency point to be measured in each measurement period of the unmanned aerial vehicle are acquired at first. Each measurement period and each frequency point to be measured in each measurement period are preset.

Each measurement period includes m scheduling slices, and the scheduling slice is a moment configured to measure each frequency point to be measured corresponding to each measurement period, m being a positive integer.

During a practical application, if the unmanned aerial vehicle system takes 10 ms as a time unit and 1 ms as a scheduling slice, a measurement period may be divided into a GAP and remaining time. The GAP may include n time units, for example, 2 ms. A GAP includes m scheduling slices, the scheduling slice is time configured to measure interference energy, and the interference energy may be represented by an RSSI. In addition, sending and receiving at a working frequency point are performed after measurement in the GAP is completed rather than during measurement in the GAP.

The unmanned aerial vehicle system mainly works in frequency bands of 2.4G and 900M. There are totally more than 100 frequency points in the frequency bands, and center frequency points are divided according to a system bandwidth of the unmanned aerial vehicle. If the system bandwidth of the unmanned aerial vehicle is 10M, 11 measurement periods are required by the more than 100 frequency points. Moreover, during the practical application, for accelerating equalization to learn about all interference conditions of the two frequency bands, cross measurement may be performed on the frequency points of the frequency bands of 2.4G and 900M during measurement. Herein, no specific limits are made in the embodiment of the present disclosure.

Accordingly, each measurement period and each frequency point to be measured in each measurement period are preset, so that the unmanned aerial vehicle may directly acquire each measurement period and each frequency point to be measured in each measurement period.

In S202, it is judged whether a present moment is a first scheduling slice of a present measurement period or not.

Specifically, the unmanned aerial vehicle starts measurement at starting time of each measurement period.

Since each GAP sequentially includes m scheduling slices sequentially numbered as 1, 2, . . . , m, each scheduling slice is also planned in advance such that energy measurement over the frequency point to be measured in each measurement period is completed in the scheduling slice. Therefore, it is necessary to judge whether the present moment is the first scheduling slice of the present measurement period or not at first herein.

In S203, in a case where the present moment is the first scheduling slice of the present measurement period, frequency point switching and measurement are sequentially performed according to each frequency point to be measured in the present measurement period to obtain an RSSI value of each frequency point to be measured in the present measurement period.

When it is determined by judgment in S202 that the present moment is the first scheduling slice of the present measurement period, the unmanned aerial vehicle configures its own hardware parameter. Specifically, frequency point, bandwidth and hardware related configurations are made in a first scheduling slice of the GAP, and after configuration is completed, measurement is performed.

After configuration is completed, frequency point switching and measurement are sequentially performed according to each frequency point to be measured in the present measurement period. That is, the frequency point to be measured corresponding to each time point may be determined according to each frequency point to be measured in the present measurement period, the working frequency point of the unmanned aerial vehicle is switched from a present working frequency point to the frequency point to be measured at this time point, then hardware of the unmanned aerial vehicle is measured, a hardware result of each frequency point to be measured is read, data collection and operation are performed according to a parameter such as an uplink/downlink bandwidth and a center frequency point, and after the GAP of the present measurement period ends, the working frequency point of the unmanned aerial vehicle is switched from the frequency point to be measured back to the present working frequency point such that the unmanned aerial vehicle returns to normal work in remaining time of the present measurement period.

Specifically, the hardware result of the unmanned aerial vehicle may be read by frequency point switching and measurement. For obtaining the RSSI value of each frequency point to be measured in the present measurement period, in an exemplary embodiment, the operation that frequency point switching and measurement are sequentially performed according to each frequency point to be measured in the present measurement period to obtain the RSSI value of each frequency point to be measured in the present measurement period may include the following operations.

Frequency point switching and measurement are sequentially performed according to each frequency point to be measured in the present measurement period to obtain an RSSI value of each subcarrier in each 1M bandwidth range corresponding to each frequency point to be measured in the present measurement period.

The RSSI value of each subcarrier in each 1M bandwidth range is accumulated corresponding to each frequency point to be measured in the present measurement period to obtain the RSSI value of each frequency point to be measured in the present measurement period.

Specifically, in the frequency bands of 2.4G and 900M, each 1M bandwidth includes one frequency point. In such case, for obtaining the RSSI value of each frequency point to be measured in the present measurement period, an accumulated energy value of the subcarrier of each megahertz may be measured at first. A bandwidth of each subcarrier is 15K, and the accumulated energy value of the subcarrier in each 1M bandwidth is an RSSI value of a center frequency point of each 1M bandwidth, i.e., the RSSI value of each subcarrier in each 1M bandwidth range corresponding to each frequency point to be measured in the present measurement period. Then, the RSSI value of each subcarrier in each 1M bandwidth range corresponding to each frequency point to be measured in the present measurement period is accumulated to obtain the RSSI value of each frequency point to be measured in the present measurement period.

In such a manner, the RSSI value of each frequency point to be measured in the present measurement period may be obtained.

In S204, frequency point switching back to a present working frequency point is performed, and the operation of judging whether the present moment is the first scheduling slice of the present measurement period or not is re-executed until an RSSI value of each frequency point to be measured in each measurement period is measured.

When the present measurement period is executed, for avoiding normal work of the unmanned aerial vehicle system, after measurement in the GAP of the present measurement period is completed, the working frequency point of the unmanned aerial vehicle is switched from the frequency point to be measured back to the present working frequency point such that the unmanned aerial vehicle may work normally in the remaining time of the present measurement period.

Then, S202 is re-executed to wait for the next measurement period.

In S205, in a case where the present moment is not the first scheduling slice of the present measurement period, the operation of judging whether the present moment is the first scheduling slice of the present measurement period or not is re-executed.

When it is determined by judgment in S202 that the present moment is not the first scheduling slice of the present measurement period, it represents that measurement of each frequency point to be measured in the present measurement period has been completed in the present measurement period or it is an (m+1)th scheduling slice of the present measurement period, namely measurement is performed at present, so that S202 is directly re-executed to wait for the next measurement period.

The operations may be repeated to complete measuring each frequency point to be measured in each measurement period until the RSSI value of each frequency point to be measured in each measurement period is obtained.

In S206, a working frequency point is redetermined according to a relationship between the RSSI value of each frequency point to be measured in each measurement period and an interference value of the present working frequency point.

Figure 3:
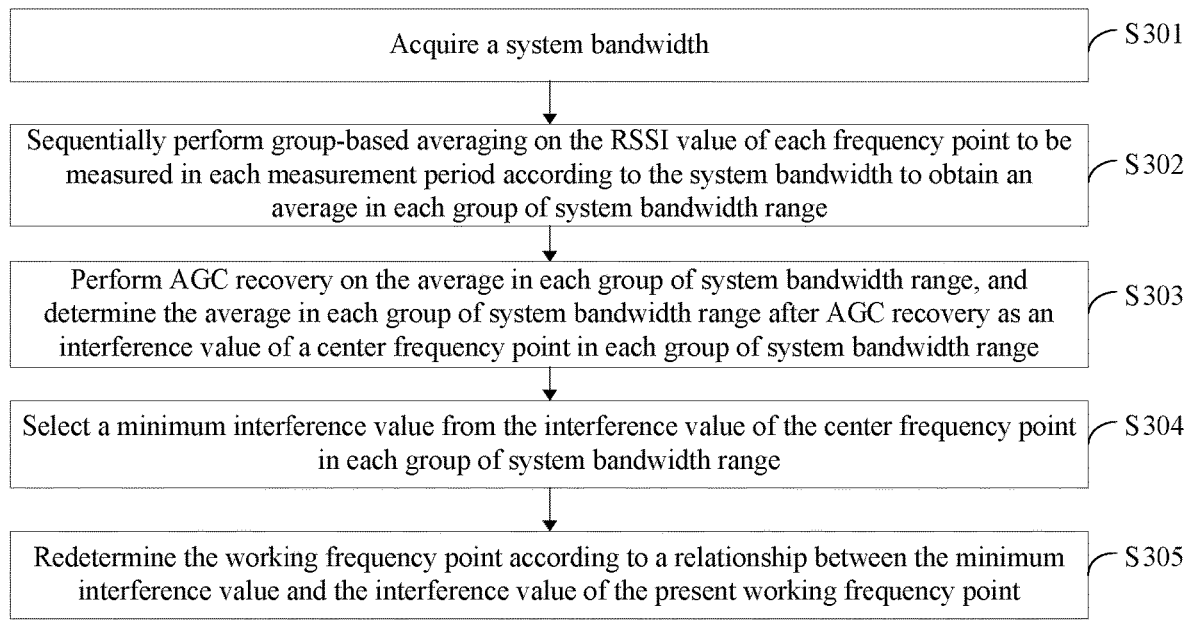
FIG. 3 is another optional flowchart of a method for determining a working frequency point according to an embodiment of the present disclosure.

The RSSI value of each frequency point to be measured in each measurement period is obtained in S204, and is a measured value, and AGC recovery is required to be performed thereon. Since there may be an influence of a noise-layer environmental factor for measurement in a practical environment, for eliminating the influence of a noise on the measured value, in an exemplary embodiment, FIG. 3 is another optional flowchart of a method for determining a working frequency point according to an embodiment of the present disclosure, and as shown in FIG. 3, S206 may include the following operations.

In S301, a system bandwidth is acquired.

In S302, group-based averaging is sequentially performed on the RSSI value of each frequency point to be measured in each measurement period according to the system bandwidth to obtain an average in each group of system bandwidth range.

In S303, AGC recovery is performed on the average in each group of system bandwidth range, and the average in each group of system bandwidth range after AGC recovery is determined as an interference value of a center frequency point in each group of system bandwidth range.

In S304, a minimum interference value is selected from the interference value of the center frequency point in each group of system bandwidth range.

In S305, the working frequency point is redetermined according to a relationship between the minimum interference value and the interference value of the present working frequency point.

Herein, it is to be noted that, if it is the unmanned aerial vehicle performing frequency point measurement, the system bandwidth is the system bandwidth of the unmanned aerial vehicle, and if it is the remote control performing frequency point measurement, the system bandwidth is the system bandwidth of the remote control.

After the unmanned aerial vehicle acquires its own system bandwidth, for convenient observation and comparison, it is necessary to perform AGC recovery and carrier averaging calculation on the RSSI and convert a numerical value into a numerical value taking db as the unit after grouping, thereby obtaining the minimum interference value. For reducing a noise introduced into the RSSI value of each frequency point to be measured in each measurement period, smoothing filtering may be performed on the RSSI value of each frequency point to be measured in each measurement period according to the system bandwidth of the unmanned aerial vehicle.

Specifically, for example, RSSI values of 107 frequency points to be measured are sequentially measured. According to the system bandwidth 10M of the unmanned aerial vehicle, the RSSI values of 10 frequency points to be measured may be sequentially averaged to obtain averages of 97 groups, i.e., the averages in each group of system bandwidth range. Finally, the average is determined as the interference value corresponding to the center frequency point in each group of system bandwidth range. For example, an average between 2.41G and 2.42G is determined as an interference value corresponding to 2.415G.

Therefore, the influence of the noise on the measured value may be reduced by smoothing filtering.

For redetermining the working frequency point of the unmanned aerial vehicle, the minimum interference value is selected from the interference values corresponding to the center frequency points in each group of system bandwidth range at first, the interference value of the present working frequency point is acquired, and then the working frequency point of the unmanned aerial vehicle is redetermined according to the relationship between the minimum interference value and the interference value of the present working frequency point.

For redetermining the working frequency point, a first preset threshold and a second preset threshold are preset. In an exemplary embodiment, S305 may include the following operations.

It is judged whether the present working frequency point is the center frequency point corresponding to the minimum interference value or not.

In a case where the present working frequency point is the center frequency point corresponding to the minimum interference value, it is judged whether the interference value of the present working frequency point is greater than a sum of the minimum interference value and a first preset threshold or not.

In a case where the interference value of the present working frequency point is greater than the sum of the minimum interference value and the first preset threshold, the center frequency point corresponding to the minimum interference value is determined as a new working frequency point.

In a case where the present working frequency point is not the center frequency point corresponding to the minimum interference value and/or in a case where the interference value of the present working frequency point is less than or equal to the sum of the minimum interference value and the first preset threshold, the working frequency point is redetermined according to a noise parameter of the present working frequency point.

It is judged at first whether the present working frequency point is the center frequency point corresponding to the minimum interference value or not. If YES, it is necessary to further judge the interference value of the present working frequency point, and only in a case where the interference value of the present working frequency point is greater than the sum of the minimum interference value and the first preset threshold, the center frequency point corresponding to the minimum interference value may be determined as the new working frequency point. Finally, the unmanned aerial vehicle switches the working frequency point from the present working frequency point to the new working frequency point, the frequency point being determined to be a frequency point corresponding to a minimum specific interference value.

In a case where the present working frequency point is not the center frequency point corresponding to the minimum interference value and/or in a case where the interference value of the present working frequency point is less than or equal to the sum of the minimum interference value and the first preset threshold, it is necessary to further judge the noise parameter of the present working frequency point to redetermine the working frequency point. That is, the working frequency point is redetermined according to the noise parameter of the present working frequency point.

For implementing redetermination of the working frequency point according to the noise parameter of the present working frequency point, in an exemplary embodiment, the operation that the working frequency point is redetermined according to the noise parameter of the present working frequency point may include the following operations.

It is judged whether an SNR of the present working frequency point is less than a second preset threshold or not.

In a case where the SNR of the present working frequency point is less than the second preset threshold, it is judged whether a noise of the present working frequency point is greater than the sum of the minimum interference value and the first preset threshold or not, and the center frequency point corresponding to the minimum interference value is determined as the new working frequency point.

In a case where the SNR of the present working frequency point is more than or equal to the second preset threshold, the present working frequency point is maintained.

In a case where the noise of the present working frequency point is less than or equal to the sum of the minimum interference value and the first preset threshold, the present working frequency point is maintained.

The SNR is equal to a difference value between Reference Signal Receiving Power (RSRP) and the noise.

That is, it is judged at first whether the SNR of the present working frequency point is less than the second preset threshold or not. If YES, it is also necessary to judge a relationship between the noise of the present working frequency point and the sum of the minimum interference value and the first preset threshold. If the noise is greater than the sum, it represents that an interference of the center frequency point corresponding to the minimum interference value is minimum, and it is necessary to determine the center frequency point corresponding to the minimum interference value as the new working frequency point. Finally, the working frequency point of the unmanned aerial vehicle is switched from the present working frequency point to the center frequency point corresponding to the minimum interference value.

In a case where the SNR of the present working frequency point is more than or equal to the second preset threshold, it represents that an interference of the present working frequency point is minimum, and it is only necessary to maintain the present working frequency point. Similarly, in a case where the noise of the present working frequency point is less than or equal to the sum of the minimum interference value and the first preset threshold, it represents that the interference of the present working frequency point is minimum, and it is only necessary to maintain the present working frequency point.

The method for determining the working frequency point in one or more abovementioned embodiments will be described below with an example.

The interference measurement accuracy and interference avoiding capability of an unmanned aerial vehicle are foundation stones of the whole unmanned aerial vehicle system as well as guarantees for stable and reliable transmission of flight control commands and real-time and high-resolution transmission of images. The existence of interferences in a working environment of the unmanned aerial vehicle has the characteristics of high burst rate, complex type and the like, so that it is necessary to perform frequency point interference detection and frequency point switching operations timely.

For implementing interference measurement, an embodiment of the present disclosure provides the following technical solution. Total energy RSSI of non-working frequency points of an aircraft and remote control that are synchronized in an environment is simultaneously measured using a GAP. In the GAP, both the remote control and the aircraft send no signals, the total energy RSSI is accumulated in a time domain, and hardware reports data to software in a frequency domain according to each subcarrier. It is determined in combination with an SNR that the frequency point corresponding to a minimum interference is finally selected for working.

Figure 4:
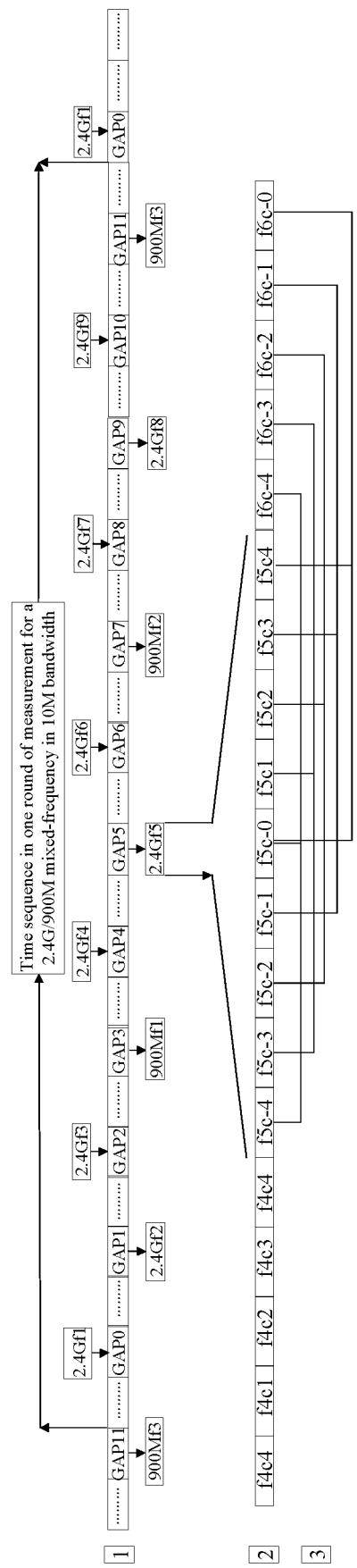
FIG. 4 is an optional schematic sequence diagram of a measurement period according to an embodiment of the present disclosure.

FIG. 4 is an optional schematic sequence diagram of a measurement period according to an embodiment of the present disclosure. As shown in FIG. 4, a bandwidth of an unmanned aerial vehicle is 10M. Interference measurement is performed on frequency points in frequency bands of 2.4G and 900M, specific ranges being 24,025M to 24,815M and 9,020M to 9,280M and an interval being 1M. Center frequency points are divided according to the system bandwidth (10M/20M) to obtain more than 100 frequency points in the frequency bands of 2.4G and 900M. 11 measurement periods are planned, and each measurement period includes a GAP and remaining time. In FIG. 4, time of the GAP may be 2 ms, and the remaining time is 38 ms. It can be seen from FIG. 4 that a planned GAP0 is configured to measure frequency points in a system bandwidth of which a center frequency point is 2.4Gf1, a planned GAP1 is configured to measure frequency points in a system bandwidth of which a center frequency point is 2.4Gf2, a planned GAP2 is configured to measure frequency points in a system bandwidth of which a center frequency point is 2.4Gf3, a planned GAP3 is configured to measure frequency points in a system bandwidth of which a center frequency point is 900Mf1 and so on. Cross measurement is performed on the frequency bands of 2.4G and 900M to rapidly complete interference measurement of the frequency points in the frequency bands of 2.4G and 900M.

Figure 5:
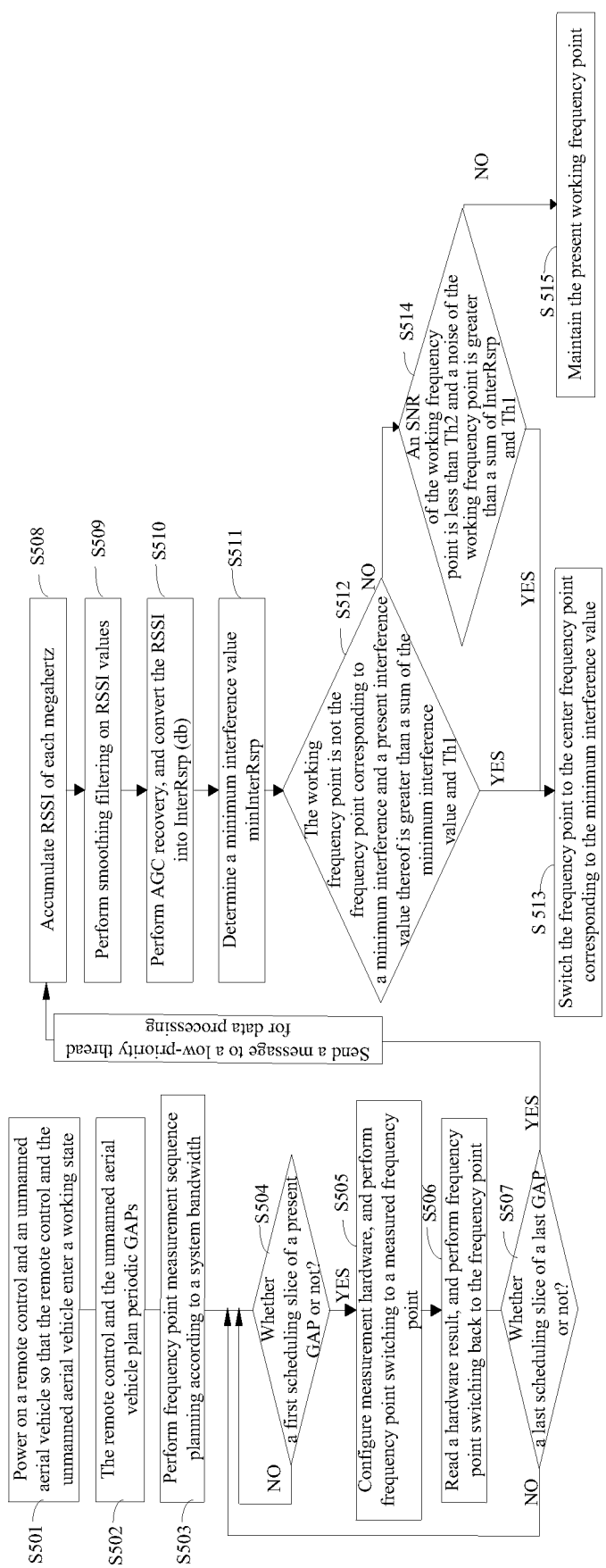
FIG. 5 is a flowchart of an optional example of a method for determining a working frequency point according to an embodiment of the present disclosure.

FIG. 5 is a flowchart of an optional example of a method for determining a working frequency point according to an embodiment of the present disclosure. As shown in FIG. 5, for example, for an unmanned aerial vehicle, the method for determining the working frequency point may include the following operations.

In S501, a remote control and the unmanned aerial vehicle are powered on to enter a working state after being time-synchronized.

In S502, the remote control and the unmanned aerial vehicle plan each measurement period of their own, wherein each measurement period includes a GAP.

In S503, the unmanned aerial vehicle allocates frequency points to be measured to each GAP according to its own system bandwidth, the number of the frequency points to be measured allocated to each GAP being more than or equal to 2.

In S504, the unmanned aerial vehicle judges whether it is a first scheduling slice of a present GAP or not at starting time of a measurement period, if YES, executes S505, and if NO, re-executes S504.

In S505, the unmanned aerial vehicle configures a hardware parameter, sequentially switches a working frequency point from a present working frequency point to each frequency point to be measured according to each frequency point to be measured in the present measurement period and performs measurement.

In S506, the unmanned aerial vehicle reads a hardware result and switches the working frequency point from the frequency point to be measured back to the present working frequency point.

In S507, the unmanned aerial vehicle judges whether it is a last scheduling slice of a last GAP or not, if YES, executes S508, and if NO, re-executes S504.

In S508, the unmanned aerial vehicle sends a message to a low-priority thread for data processing, obtains an energy value of a subcarrier of each megahertz according to the read hardware result and performs superimposition.

Specifically, an RSSI value in each 1M range taking a center frequency point as a center may be obtained according to the center frequency point of each 1M bandwidth and the number of subcarriers covered by each 1M bandwidth to further obtain an RSSI value of each frequency point to be measured. The number of frequency point energy values that may specifically be obtained is determined by a magnitude of the system bandwidth.

In S509, the unmanned aerial vehicle performs smoothing filtering according to a measured RSSI value of each frequency point to be measured to obtain an average in each group of system bandwidth range.

Herein, as shown in FIG. 4, a frequency point measured in a GAPS is 2.4Gf5, frequency points in 2.4Gf5 including f5c-4, f5c-3, f5c-2, f5c-1, f5c-0, f5c-1, f5c-2, f5c-3 and f5c-4. When smoothing filtering is performed, all the frequency points corresponding to the center frequency point f5c-0 are averaged. By parity of reasoning, an average of each group is obtained.

In S510, the unmanned aerial vehicle performs AGC recovery on the average of each group to obtain an interference value corresponding to a center frequency point in each group of system bandwidth range, represented by InterRsrp.

In S511, the unmanned aerial vehicle sequences the interference values corresponding to the center frequency points in each group of system bandwidth range and selects a minimum interference value, represented by minInterRsrp.

In S512, the unmanned aerial vehicle judges whether the present working frequency point is the center frequency point corresponding to the minimum interference value or not, judges whether an interference value of the present working frequency point is greater than a sum of the minimum interference value and a first preset threshold or not, if both results are YES, executes S513, and if any result is NO or both results are NO, executes S514.

In S513, the unmanned aerial vehicle determines the center frequency point corresponding to the minimum interference value as a new working frequency point and switches the working frequency point from the present working frequency point to the new working frequency point.

In S514, the unmanned aerial vehicle judges whether an SNR of the present working frequency point is less than a second preset threshold or not, judges whether a noise of the present working frequency point is greater than the sum of the minimum interference value and the first preset threshold or not, if both results are YES, executes S513, and if any result is NO or both results are NO, executes S515.

In S515, the present working frequency point is maintained.

During the practical application, with adoption of such a rapid interference measurement method, under a full-band interference condition in a 20M system bandwidth scenario, measurement may be updated once within shortest GAP*the number of GAPs for a measurement round of the system bandwidth, selection of about more than 80 frequency points (except edge frequency points in 107 frequency points) is supported. Interferences of environments to aircrafts and interferences between the aircrafts are effectively eliminated, and a whole 80M frequency band is theoretically supported to be simultaneously used by eight sets, with each set using a 10M bandwidth, with extremely low interferences during flight of aircrafts. Tests show that an expected result may be achieved, the anti-interference capability may be improved remarkably, and experience effects of consumers are improved.

In the example, the unmanned aerial vehicle and the remote control negotiate about fixed interference resource configuration parameters including the measurement period, a measurement time length, aircraft signal sending turning-on/off time and the like, and after the center frequency points are set, interference energy of subcarriers in all frequency-domain ranges in the system bandwidth is obtained, so that interference conditions of all the frequency points in the bandwidth may be obtained. The advantages of high accuracy and short delay are achieved, and a flight distance of the aircraft and the channel quality are greatly improved to ensure the image transmission performance.

That is, in the embodiment of the present disclosure, through a method for calculating frequency-domain data in the whole bandwidth based on a simplified Interference Measurement Resource (IMR) configuration, an interference measurement system device improves the interference measurement timeliness and accuracy and timely avoids interference frequency points. In the embodiment of the present disclosure, for solving the problems that the unmanned aerial vehicle and the remote control are inconsistent in interference and the interferences are not measured timely, total signal energy of a non-working frequency point is detected as a criterion, so that higher anti-interference performance is achieved.

The embodiment of the present disclosure provides the method for determining the working frequency point. The method is applied to the unmanned aerial vehicle or remote control of the unmanned aerial vehicle system. The method includes the following operations. At first, when both the unmanned aerial vehicle and the remote control are in the working state after being time-synchronized, each measurement period and each frequency point to be measured in each measurement period are acquired, wherein each measurement period includes the m scheduling slices, the scheduling slice being the moment configured to measure each frequency point to be measured corresponding to each measurement period, and m is a positive integer, so that the specific frequency point to be measured at specific time may be obtained. Then, it is judged whether the present moment is the first scheduling slice of the present measurement period or not. In a case where the present moment is the first scheduling slice of the present measurement period, frequency point switching and measurement are sequentially performed according to each frequency point to be measured in the present measurement period to obtain the RSSI value of each frequency point to be measured in the present measurement period, frequency point switching back to the present working frequency point is performed, and the operation of judging whether the present moment is the first scheduling slice of the present measurement period or not is re-executed until the RSSI value of each frequency point to be measured in each measurement period is measured. In a case where the present moment is not the first scheduling slice of the present measurement period, the operation of judging whether the present moment is the first scheduling slice of the present measurement period or not is re-executed, and the operations may be repeated to acquire the RSSI value of each frequency point to be measured in each measurement period. Finally, the working frequency point is redetermined according to the relationship between the RSSI value of each frequency point to be measured in each measurement period and the interference value of the present working frequency point. That is, in the embodiments of the present disclosure, the RSSI value of each frequency point to be measured in each measurement period may be obtained by measurement according to each set measurement period and each frequency point to be measured in each measurement period, namely multiple frequency points to be measured may be measured using one measurement period, which shortens interference measurement time, and furthermore, the working frequency point is redetermined according to the relationship between the RSSI value of each frequency point to be measured in each measurement period and the interference value of the present working frequency point. In such a manner, one measurement period is set to measure multiple frequency points to be measured, so that the interference measurement speed is increased, and the interference measurement efficiency of the unmanned aerial vehicle system is improved.

Figure 6:
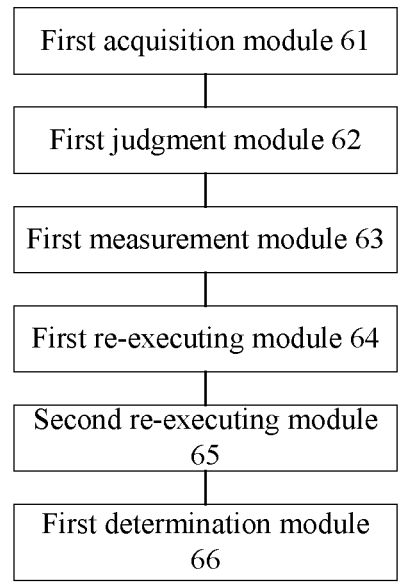
FIG. 6 is a first optional structure diagram of an unmanned aerial vehicle according to an embodiment of the present disclosure.

Based on the same inventive concept, the embodiments of the present disclosure also provide an unmanned aerial vehicle. FIG. 6 is a first optional structure diagram of an unmanned aerial vehicle according to an embodiment of the present disclosure. As shown in FIG. 6, the unmanned aerial vehicle is arranged in an unmanned aerial vehicle system, the unmanned aerial vehicle system further including a remote control, and the unmanned aerial vehicle may include a first acquisition module 61, a first judgment module 62, a first measurement module 63, a first re-executing module 64, a second re-executing module 65 and a first determination module 66.

The first acquisition module 61 is configured to, in a case where both the unmanned aerial vehicle and the remote control are in a working state after being time-synchronized, acquire each measurement period and each frequency point to be measured in each measurement period, wherein each measurement period includes m scheduling slices, the scheduling slice is a moment for measuring each frequency point to be measured corresponding to each measurement period, and m is a positive integer.

The first judgment module 62 is configured to judge whether a present moment is a first scheduling slice of a present measurement period or not.

The first measurement module 63 is configured to, in a case where the present moment is the first scheduling slice of the present measurement period, sequentially perform frequency point switching and measurement according to each frequency point to be measured in the present measurement period to obtain an RSSI value of each frequency point to be measured in the present measurement period.

The first re-executing module 64 is configured to perform frequency point switching back to a present working frequency point to return to the operation of judging whether the present moment is the first scheduling slice of the present measurement period or not until an RSSI value of each frequency point to be measured in each measurement period is measured.

The second re-executing module 65 is configured to, in a case where the present moment is not the first scheduling slice of the present measurement period, re-execute the operation of judging whether the present moment is the first scheduling slice of the present measurement period or not.

The first determination module 66 is configured to redetermine a working frequency point according to a relationship between the RSSI value of each frequency point to be measured in each measurement period and an interference value of the present working frequency point.

In an exemplary embodiment, the first measurement module 63, when configured to sequentially perform frequency point switching and measurement according to each frequency point to be measured in the present measurement period to obtain the RSSI value of each frequency point to be measured in the present measurement period, is configured to:
sequentially perform frequency point switching and measurement according to each frequency point to be measured in the present measurement period to obtain an RSSI value of each subcarrier in each 1M bandwidth range corresponding to each frequency point to be measured in the present measurement period; and accumulate the RSSI value of each subcarrier in each 1M bandwidth range corresponding to each frequency point to be measured in the present measurement period to obtain the RSSI value of each frequency point to be measured in the present measurement period.

In an exemplary embodiment, the first determination module 66 may include:
a first acquisition submodule, configured to acquire a system bandwidth;
a first calculation submodule, configured to sequentially perform group-based averaging on the RSSI value of each frequency point to be measured in each measurement period according to the system bandwidth to obtain an average in each group of system bandwidth range;
a first determination submodule, configured to perform AGC recovery on the average in each group of system bandwidth range and determine the average in each group of system bandwidth range after AGC recovery as an interference value of a center frequency point in each group of system bandwidth range;
a first selection submodule, configured to select a minimum interference value from the interference value of the center frequency point in each group of system bandwidth range; and
a first redetermination submodule, configured to redetermine the working frequency point according to a relationship between the minimum interference value and the interference value of the present working frequency point.

In an exemplary embodiment, the first redetermination submodule is configured to:
judge whether the present working frequency point is the center frequency point corresponding to the minimum interference value or not;
in a case where the present working frequency point is the center frequency point corresponding to the minimum interference value, judge whether the interference value of the present working frequency point is greater than a sum of the minimum interference value and a first preset threshold or not;
in a case where the interference value of the present working frequency point is greater than the sum of the minimum interference value and the first preset threshold, determine the center frequency point corresponding to the minimum interference value as a new working frequency point; and
in a case where the present working frequency point is not the center frequency point corresponding to the minimum interference value and/or in a case where the interference value of the present working frequency point is less than or equal to the sum of the minimum interference value and the first preset threshold, redetermine the working frequency point according to a noise parameter of the present working frequency point.

In an exemplary embodiment, the first redetermination submodule, when configured to redetermine the working frequency point according to the noise parameter of the present working frequency point, is configured to:

judge whether an SNR of the present working frequency point is less than a second preset threshold or not;

in a case where the SNR of the present working frequency point is less than the second preset threshold, judge whether a noise of the present working frequency point is greater than the sum of the minimum interference value and the first preset threshold or not and determine the center frequency point corresponding to the minimum interference value as the new working frequency point;

in a case where the SNR of the present working frequency point is more than or equal to the second preset threshold, maintain the present working frequency point; and in a case where the noise of the present working frequency point is less than or equal to the sum of the minimum interference value and the first preset threshold, maintain the present working frequency point.

During a practical application, the first acquisition module 61, the first judgment module 62, the first measurement module 63, the first re-executing module 64, the second re-executing module 65, the first determination module 66, the first acquisition submodule, the first calculation submodule, the first determination submodule, the first selection submodule and the first redetermination submodule may be implemented by a processor of the unmanned aerial vehicle, and is specifically implemented by a Central Processing Unit (CPU), a Microprocessor Unit (MPU), a Digital Signal Processor (DSP) or a Field Programmable Gate Array (FPGA), etc.

Figure 7:
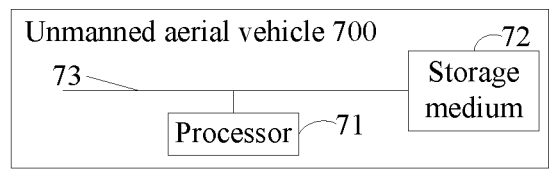
FIG. 7 is a second optional structure diagram of an unmanned aerial vehicle according to an embodiment of the present disclosure.

FIG. 7 is a second optional structure diagram of an unmanned aerial vehicle according to an embodiment of the present disclosure. As shown in FIG. 7, the embodiment of the present disclosure provides an unmanned aerial vehicle 700, which includes:

a processor 71 and a storage medium 72 storing an instruction executable for the processor 71. The storage medium 72 executes an operation based on the processor 71 through a communication bus 73. The instruction is executed by the processor 71 to execute the method for determining the working frequency point as described in embodiment 1.

It is to be noted that, during the practical application, each component in the terminal is coupled together through the communication bus 73. It can be understood that the communication bus 73 is configured to implement connection communication between these components. The communication bus 73 includes a data bus and also includes a power bus, a control bus and a state signal bus. However, for clear description, each bus in FIG. 7 is marked as the communication bus 73.

Figure 8:
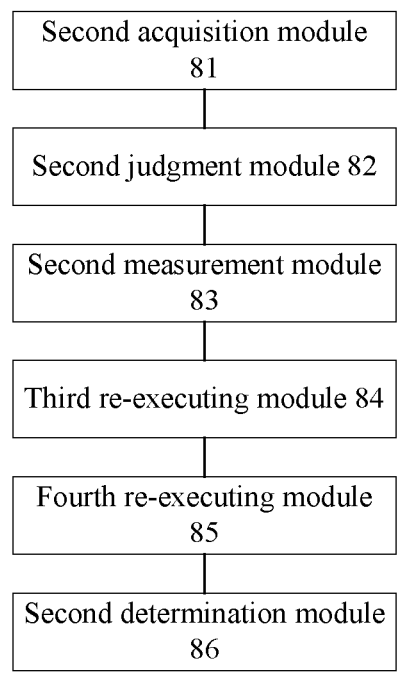
FIG. 8 is a first optional structure diagram of a remote control according to an embodiment of the present disclosure.

The embodiments of the present disclosure also provide a remote control. FIG. 8 is a first optional structure diagram of a remote control according to an embodiment of the present disclosure. As shown in FIG. 8, the remote control is arranged in an unmanned aerial vehicle system, the unmanned aerial vehicle system further including an unmanned aerial vehicle, and the remote control may include a second acquisition module 81, a second judgment module 82, a second measurement module 83, a third re-executing module 84, a fourth re-executing module 85 and a second determination module 86.

The second acquisition module 81 is configured to, in a case where both the unmanned aerial vehicle and the remote control are in a working state after being time-synchronized, acquire each measurement period and each frequency point to be measured in each measurement period, wherein each measurement period includes m scheduling slices, the scheduling slice is a moment for measuring each frequency point to be measured corresponding to each measurement period, and m is a positive integer.

The second judgment module 82 is configured to judge whether a present moment is a first scheduling slice of a present measurement period or not.

The second measurement module 83 is configured to, in a case where the present moment is the first scheduling slice of the present measurement period, sequentially perform frequency point switching and measurement according to each frequency point to be measured in the present measurement period to obtain an RSSI value of each frequency point to be measured in the present measurement period.

The third re-executing module 84 is configured to perform frequency point switching back to a present working frequency point to return to the operation of judging whether the present moment is the first scheduling slice of the present measurement period or not until an RSSI value of each frequency point to be measured in each measurement period is measured.

The fourth re-executing module 85 is configured to, in a case where the present moment is not the first scheduling slice of the present measurement period, re-execute the operation of judging whether the present moment is the first scheduling slice of the present measurement period or not.

The second determination module 86 is configured to redetermine a working frequency point according to a relationship between the RSSI value of each frequency point to be measured in each measurement period and an interference value of the present working frequency point.

In an exemplary embodiment, the second measurement module 83, when configured to sequentially perform frequency point switching and measurement according to each frequency point to be measured in the present measurement period to obtain the RSSI value of each frequency point to be measured in the present measurement period, is configured to:

sequentially perform frequency point switching and measurement according to each frequency point to be measured in the present measurement period to obtain an RSSI value of each subcarrier in each 1M bandwidth range corresponding to each frequency point to be measured in the present measurement period; and accumulate the RSSI value of each subcarrier in each 1M bandwidth range corresponding to each frequency point to be measured in the present measurement period to obtain the RSSI value of each frequency point to be measured in the present measurement period.

In an exemplary embodiment, the second determination module 86 may include:

a second acquisition submodule, configured to acquire a system bandwidth;

a second calculation submodule, configured to sequentially perform group-based averaging on the RSSI value of each frequency point to be measured in each measurement period according to the system bandwidth to obtain an average in each group of system bandwidth range;

a second determination submodule, configured to perform AGC recovery on the average in each group of system bandwidth range and determine the average in each group of system bandwidth range after AGC recovery as an interference value of a center frequency point in each group of system bandwidth range;

a second selection submodule, configured to select a minimum interference value from the interference value of the center frequency point in each group of system bandwidth range; and a second redetermination submodule, configured to redetermine the working frequency point according to a relationship between the minimum interference value and the interference value of the present working frequency point.

In an exemplary embodiment, the second redetermination submodule is configured to:

judge whether the present working frequency point is the center frequency point corresponding to the minimum interference value or not;

in a case where the present working frequency point is the center frequency point corresponding to the minimum interference value, judge whether the interference value of the present working frequency point is greater than a sum of the minimum interference value and a first preset threshold or not;

in a case where the interference value of the present working frequency point is greater than the sum of the minimum interference value and the first preset threshold, determine the center frequency point corresponding to the minimum interference value as a new working frequency point; and in a case where the present working frequency point is not the center frequency point corresponding to the minimum interference value and/or in a case where the interference value of the present working frequency point is less than or equal to the sum of the minimum interference value and the first preset threshold, redetermine the working frequency point according to a noise parameter of the present working frequency point.

In an exemplary embodiment, the second redetermination submodule, when configured to redetermine the working frequency point according to the noise parameter of the present working frequency point, is configured to:

judge whether an SNR of the present working frequency point is less than a second preset threshold or not;

in a case where the SNR of the present working frequency point is less than the second preset threshold, judge whether a noise of the present working frequency point is greater than the sum of the minimum interference value and the first preset threshold or not and determine the center frequency point corresponding to the minimum interference value as the new working frequency point;

in a case where the SNR of the present working frequency point is more than or equal to the second preset threshold, maintain the present working frequency point; and in a case where the noise of the present working frequency point is less than or equal to the sum of the minimum interference value and the first preset threshold, maintain the present working frequency point.

During a practical application, the second acquisition module 81, the second judgment module 82, the second measurement module 83, the third re-executing module 84, the fourth re-executing module 85, the second determination module 86, the second acquisition submodule, the second calculation submodule, the second determination submodule, the second selection submodule and the second redetermination submodule may be implemented by a processor of the remote control, and is specifically implemented by a CPU, an MPU, a DSP or an FPGA, etc.

Figure 9:
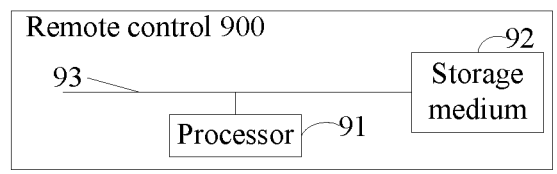
FIG. 9 is a second optional structure diagram of a remote control according to an embodiment of the present disclosure.

FIG. 9 is a second optional structure diagram of a remote control according to an embodiment of the present disclosure. As shown in FIG. 9, the embodiment of the present disclosure provides a remote control 900, which includes:

a processor 91 and a storage medium 92 storing an instruction executable for the processor 91. The storage medium 92 executes an operation based on the processor 91 through a communication bus 93. The instruction is executed by the processor 91 to execute the method for determining the working frequency point as described in embodiment 1.

It is to be noted that, during the practical application, each component in the terminal is coupled together through the communication bus 93. It can be understood that the communication bus 93 is configured to implement connection communication between these components. The communication bus 93 includes a data bus and also includes a power bus, a control bus and a state signal bus. However, for clear description, each bus in FIG. 9 is marked as the communication bus 93.

The embodiments of the present disclosure also provide an unmanned aerial vehicle system. FIG. 1 is an optional structure diagram of an unmanned aerial vehicle system according to an embodiment of the present disclosure. As shown in FIG. 1, the unmanned aerial vehicle system 11 includes the unmanned aerial vehicle 111 as described in one or more abovementioned embodiments and the remote control 112 as described in one or more abovementioned embodiments. The unmanned aerial vehicle 111 establishes a communication connection with the remote control 112.

The embodiments of the present disclosure provide a computer storage medium storing an executable instruction which is executed by one or more processors to enable the processor to execute the method for determining the working frequency point as described in embodiment 1.

The computer storage medium may be a memory such as a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a flash memory, a magnetic surface memory, an optical disk or a Compact Disc Read-Only Memory (CD-ROM).

It is to be noted that, in the present disclosure, terms "include" and "contain" or any other transformations thereof are intended to cover nonexclusive inclusions such that a process, method, object or device including a series of elements not only includes those elements but also includes other elements that are not clearly listed or further includes elements intrinsic to the process, the method, the object or the device. Under the condition of no more limitations, an element limited by a statement "including a/an" does not exclude existence of another identical element in a process, method, object or device including the element.

The sequence numbers of the embodiments of the present disclosure are only adopted for description and do not represent superiority-inferiority of the embodiments.

Through the above descriptions about the implementation modes, those skilled in the art may clearly know that the methods of the embodiments may be implemented in a manner of combining software and a required universal hardware platform and, of course, may also be implemented through hardware, but the former is an exemplary implementation mode under many circumstances. Based on such an understanding, the technical solutions of the present disclosure substantially or parts making contributions to a conventional art may be embodied in form of a software product. The computer software product is stored in a storage medium (for example, a ROM/Random Access Memory (RAM), a magnetic disk and an optical disk), including a plurality of instructions configured to enable a terminal (which may be a mobile phone, a computer, a server, an air conditioner, a network device or the like) to execute the method of each embodiment of the present disclosure.

The embodiments of the present disclosure are described above in combination with the drawings. However, the present disclosure is not limited to the specific implementation modes, and the specific implementation modes are only schematic and nonrestrictive. Under the inspiration of the present disclosure, those of ordinary skill in the art may also make many forms without departing from the objective of the present disclosure and the scope of protection of the claims, and all these forms fall within the scope of protection of the present disclosure.

INDUSTRIAL APPLICABILITY

As described above, the method for determining the working frequency point, unmanned aerial vehicle, remote control, unmanned aerial vehicle system and computer storage medium provided in the embodiments of the present disclosure have the following beneficial effects: the RSSI value of each frequency point to be measured in each measurement period may be obtained by measurement according to each set measurement period and each frequency point to be measured in each measurement period, namely multiple frequency points to be measured may be measured using one measurement period, which shortens interference measurement time, and furthermore, the working frequency point is redetermined according to the relationship between the RSSI value of each frequency point to be measured in each measurement period and the interference value of the present working frequency point. In such a manner, one measurement period is set to measure multiple frequency points to be measured, so that the interference measurement speed is increased, and the interference measurement efficiency of the unmanned aerial vehicle system is improved.

What is claimed is:

1. A method for determining a working frequency point, performed by an unmanned aerial vehicle or a remote control in an unmanned aerial vehicle system and comprising:
in a case where both the unmanned aerial vehicle and the remote control are in a working state after being time-synchronized, acquiring each measurement period and each frequency point to be measured in each measurement period, wherein each measurement period comprises m scheduling slices, the scheduling slice is a moment for measuring each frequency point to be measured corresponding to each measurement period, and m is a positive integer;
judging whether a present moment is a first scheduling slice of a present measurement period or not;
in a case where the present moment is the first scheduling slice of the present measurement period, sequentially performing frequency point switching and measurement according to each frequency point to be measured in the present measurement period to obtain a Received Signal Strength Indication (RSSI) value of each frequency point to be measured in the present measurement period;
performing frequency point switching back to a present working frequency point, and re-executing the operation of judging whether the present moment is the first scheduling slice of the present measurement period or not until an RSSI value of each frequency point to be measured in each measurement period is measured;
in a case where the present moment is not the first scheduling slice of the present measurement period, re-executing the operation of judging whether the present moment is the first scheduling slice of the present measurement period or not; and
redetermining a working frequency point according to a relationship between the RSSI value of each frequency point to be measured in each measurement period and an interference value of the present working frequency point to eliminate influence of noise on measured values by performing smoothing filtering on the RSSI value of each frequency point to be measured in each measurement period according to a system bandwidth.

2. The method according to claim 1, wherein sequentially performing frequency point switching and measurement according to each frequency point to be measured in the present measurement period to obtain the RSSI value of each frequency point to be measured in the present measurement period comprises:
sequentially performing frequency point switching and measurement according to each frequency point to be measured in the present measurement period to obtain an RSSI value of each subcarrier in each 1M bandwidth range corresponding to each frequency point to be measured in the present measurement period; and
accumulating the RSSI value of each subcarrier in each 1M bandwidth range corresponding to each frequency point to be measured in the present measurement period to obtain the RSSI value of each frequency point to be measured in the present measurement period.

3. The method according to claim 1, wherein redetermining the working frequency point according to the relationship between the RSSI value of each frequency point to be measured in each measurement period and the interference value of the present working frequency point comprises:
acquiring a system bandwidth;
sequentially performing group-based averaging on the RSSI value of each frequency point to be measured in each measurement period according to the system bandwidth to obtain an average in each group of system bandwidth range;
performing Automatic Gain Control (AGC) recovery on the average in each group of system bandwidth range, and determining the average in each group of system bandwidth range after AGC recovery as an interference value of a center frequency point in each group of system bandwidth range;
selecting a minimum interference value from the interference value of the center frequency point in each group of system bandwidth range; and
redetermining the working frequency point according to a relationship between the minimum interference value and the interference value of the present working frequency point to eliminate the influence of the noise on the measured values.

4. The method according to claim 3, wherein redetermining the working frequency point according to the relationship between the minimum interference value and the interference value of the present working frequency point comprises:

judging whether the present working frequency point is the center frequency point corresponding to the minimum interference value or not;

in a case where the present working frequency point is the center frequency point corresponding to the minimum interference value, judging whether the interference value of the present working frequency point is greater than a sum of the minimum interference value and a first preset threshold or not;

in a case where the interference value of the present working frequency point is greater than the sum of the minimum interference value and the first preset threshold, determining the center frequency point corresponding to the minimum interference value as a new working frequency point; and in a case where the present working frequency point is not the center frequency point corresponding to the minimum interference value and/or in a case where the interference value of the present working frequency point is less than or equal to the sum of the minimum interference value and the first preset threshold, redetermining the working frequency point according to a noise parameter of the present working frequency point to eliminate the influence of the noise on the measured values.

5. The method according to claim 4, wherein redetermining the working frequency point according to the noise parameter of the present working frequency point comprises:

judging whether a Signal-Noise Ratio (SNR) of the present working frequency point is less than a second preset threshold or not;

in a case where the SNR of the present working frequency point is less than the second preset threshold, judging whether a noise of the present working frequency point is greater than the sum of the minimum interference value and the first preset threshold or not, and determining the center frequency point corresponding to the minimum interference value as the new working frequency point;

in a case where the SNR of the present working frequency point is more than or equal to the second preset threshold, maintaining the present working frequency point; and in a case where the noise of the present working frequency point is less than or equal to the sum of the minimum interference value and the first preset threshold, maintaining the present working frequency point.

6. The method according to claim 3, wherein in a case where the method is performed by the unmanned aerial vehicle, the system bandwidth is the system bandwidth of the unmanned aerial vehicle; and in a case where the method is performed by the remote control, the system bandwidth is the system bandwidth of the remote control.

7. A non-transitory computer storage medium storing an executable instruction which is executed by one or more processors to enable the processor to execute the method for determining the working frequency point according to claim 1.

8. The method according to claim 1, in a case where the present moment is the first scheduling slice of the present measurement period, further comprising:

configuring, by the unmanned aerial vehicle or the remote control, a hardware parameter of the unmanned aerial vehicle or the remote control.

9. The method according to claim 8, wherein configuring, by the unmanned aerial vehicle or the remote control, the hardware parameter of the unmanned aerial vehicle or the remote control comprises:

making frequency point, bandwidth and hardware related configurations in the first scheduling slice of a GAP.

10. An unmanned aerial vehicle, arranged in an unmanned aerial vehicle system, the unmanned aerial vehicle system further comprising a remote control, the unmanned aerial vehicle comprising a memory storing instructions and a processor in communication with the memory, wherein the processor is configured to execute the instructions to:

in a case where both the unmanned aerial vehicle and the remote control are in a working state after being time-synchronized, acquire each measurement period and each frequency point to be measured in each measurement period, wherein each measurement period comprises m scheduling slices, the scheduling slice is a moment for measuring each frequency point to be measured corresponding to each measurement period, and m is a positive integer;

judge whether a present moment is a first scheduling slice of a present measurement period or not;

in a case where the present moment is the first scheduling slice of the present measurement period, sequentially perform frequency point switching and measurement according to each frequency point to be measured in the present measurement period to obtain a Received Signal Strength Indication (RSSI) value of each frequency point to be measured in the present measurement period;

perform frequency point switching back to a present working frequency point and re-execute the operation of judging whether the present moment is the first scheduling slice of the present measurement period or not until an RSSI value of each frequency point to be measured in each measurement period is measured;

in a case where the present moment is not the first scheduling slice of the present measurement period, re-execute the operation of judging whether the present moment is the first scheduling slice of the present measurement period or not; and redetermine a working frequency point according to a relationship between the RSSI value of each frequency point to be measured in each measurement period and an interference value of the present working frequency point to eliminate influence of noise on measured values by performing smoothing filtering on the RSSI value of each frequency point to be measured in each measurement period according to a system bandwidth.

11. The unmanned aerial vehicle according to claim 10, wherein the processor, when configured to sequentially perform frequency point switching and measurement according to each frequency point to be measured in the present measurement period to obtain the RSSI value of each frequency point to be measured in the present measurement period, is configured to:

sequentially perform frequency point switching and measurement according to each frequency point to be measured in the present measurement period to obtain an RSSI value of each subcarrier in each 1M bandwidth range corresponding to each frequency point to be measured in the present measurement period; and accumulate the RSSI value of each subcarrier in each 1M bandwidth range corresponding to each frequency point to be measured in the present measurement period to obtain the RSSI value of each frequency point to be measured in the present measurement period.

12. The unmanned aerial vehicle according to claim 10, wherein the processor, when configured to redetermine the working frequency point according to the relationship between the RSSI value of each frequency point to be measured in each measurement period and the interference value of the present working frequency point, is configured to:

acquire a system bandwidth;

sequentially perform group-based averaging on the RSSI value of each frequency point to be measured in each measurement period according to the system bandwidth to obtain an average in each group of system bandwidth range;

perform AGC recovery on the average in each group of system bandwidth range and determine the average in each group of system bandwidth range after AGC recovery as an interference value of a center frequency point in each group of system bandwidth range;

select a minimum interference value from the interference value of the center frequency point in each group of system bandwidth range; and redetermine the working frequency point according to a relationship between the minimum interference value and the interference value of the present working frequency point to eliminate the influence of the noise on the measured values.

13. The unmanned aerial vehicle according to claim 12, wherein the processor, when configured to redetermine the working frequency point according to a relationship between the minimum interference value and the interference value of the present working frequency point, is configured to:

judge whether the present working frequency point is the center frequency point corresponding to the minimum interference value or not;

in a case where the present working frequency point is the center frequency point corresponding to the minimum interference value, judge whether the interference value of the present working frequency point is greater than a sum of the minimum interference value and a first preset threshold or not;

in a case where the interference value of the present working frequency point is greater than the sum of the minimum interference value and the first preset threshold, determine the center frequency point corresponding to the minimum interference value as a new working frequency point; and in a case where the present working frequency point is not the center frequency point corresponding to the minimum interference value and/or in a case where the interference value of the present working frequency point is less than or equal to the sum of the minimum interference value and the first preset threshold, redetermine the working frequency point according to a noise parameter of the present working frequency point to eliminate the influence of the noise on the measured values.

14. The unmanned aerial vehicle according to claim 13, wherein the processor, when configured to redetermine the working frequency point according to the noise parameter of the present working frequency point, is configured to:

judge whether an SNR of the present working frequency point is less than a second preset threshold or not;

in a case where the SNR of the present working frequency point is less than the second preset threshold, judge whether a noise of the present working frequency point is greater than the sum of the minimum interference value and the first preset threshold or not and determine the center frequency point corresponding to the minimum interference value as the new working frequency point;

in a case where the SNR of the present working frequency point is more than or equal to the second preset threshold, maintain the present working frequency point; and in a case where the noise of the present working frequency point is less than or equal to the sum of the minimum interference value and the first preset threshold, maintain the present working frequency point.

15. A remote control, arranged in an unmanned aerial vehicle system, the unmanned aerial vehicle system further comprising an unmanned aerial vehicle, the remote control comprising a memory storing instructions and a processor in communication with the memory, wherein the processor is configured to execute the instructions to:

in a case where both the unmanned aerial vehicle and the remote control are in a working state after being time-synchronized, acquire each measurement period and each frequency point to be measured in each measurement period, wherein each measurement period comprises m scheduling slices, the scheduling slice is a moment for measuring each frequency point to be measured corresponding to each measurement period, and m is a positive integer;

judge whether a present moment is a first scheduling slice of a present measurement period or not;

in a case where the present moment is the first scheduling slice of the present measurement period, sequentially perform frequency point switching and measurement according to each frequency point to be measured in the present measurement period to obtain a Received Signal Strength Indication (RSSI) value of each frequency point to be measured in the present measurement period;

perform frequency point switching back to a present working frequency point and re-execute the operation of judging whether the present moment is the first scheduling slice of the present measurement period or not until an RSSI value of each frequency point to be measured in each measurement period is measured;

in a case where the present moment is not the first scheduling slice of the present measurement period, re-execute the operation of judging whether the present moment is the first scheduling slice of the present measurement period or not; and redetermine a working frequency point according to a relationship between the RSSI value of each frequency point to be measured in each measurement period and an interference value of the present working frequency point to eliminate influence of noise on measured values by performing smoothing filtering on the RSSI value of each frequency point to be measured in each measurement period according to a system bandwidth.

16. The remote control according to claim 15, wherein the processor, when configured to sequentially perform frequency point switching and measurement according to each frequency point to be measured in the present measurement period to obtain the RSSI value of each frequency point to be measured in the present measurement period, is configured to:

sequentially perform frequency point switching and measurement according to each frequency point to be measured in the present measurement period to obtain an RSSI value of each subcarrier in each 1M bandwidth range corresponding to each frequency point to be measured in the present measurement period; and accumulate the RSSI value of each subcarrier in each 1M bandwidth range corresponding to each frequency point to be measured in the present measurement period to obtain the RSSI value of each frequency point to be measured in the present measurement period.

17. The remote control according to claim 15, wherein the processor, when configured to redetermine the working frequency point according to the relationship between the RSSI value of each frequency point to be measured in each measurement period and the interference value of the present working frequency point, is configured to:

acquire a system bandwidth;

sequentially perform group-based averaging on the RSSI value of each frequency point to be measured in each measurement period according to the system bandwidth to obtain an average in each group of system bandwidth range;

perform AGC recovery on the average in each group of system bandwidth range and determine the average in each group of system bandwidth range after AGC recovery as an interference value of a center frequency point in each group of system bandwidth range;

select a minimum interference value from the interference value of the center frequency point in each group of system bandwidth range; and redetermine the working frequency point according to a relationship between the minimum interference value and the interference value of the present working frequency point to eliminate the influence of the noise on the measured values.

18. The remote control according to claim 17, wherein the processor, when configured to redetermine the working frequency point according to a relationship between the minimum interference value and the interference value of the present working frequency point, is configured to:

judge whether the present working frequency point is the center frequency point corresponding to the minimum interference value or not;

in a case where the present working frequency point is the center frequency point corresponding to the minimum interference value, judge whether the interference value of the present working frequency point is greater than a sum of the minimum interference value and a first preset threshold or not;

in a case where the interference value of the present working frequency point is greater than the sum of the minimum interference value and the first preset threshold, determine the center frequency point corresponding to the minimum interference value as a new working frequency point; and in a case where the present working frequency point is not the center frequency point corresponding to the minimum interference value and/or in a case where the interference value of the present working frequency point is less than or equal to the sum of the minimum interference value and the first preset threshold, redetermine the working frequency point according to a noise parameter of the present working frequency point to eliminate the influence of the noise on the measured values.

19. The remote control according to claim 18, wherein the processor, when configured to redetermine the working frequency point according to the noise parameter of the present working frequency point, is configured to:

judge whether an SNR of the present working frequency point is less than a second preset threshold or not;

in a case where the SNR of the present working frequency point is less than the second preset threshold, judge whether a noise of the present working frequency point is greater than the sum of the minimum interference value and the first preset threshold or not and determine the center frequency point corresponding to the minimum interference value as the new working frequency point;

in a case where the SNR of the present working frequency point is more than or equal to the second preset threshold, maintain the present working frequency point; and in a case where the noise of the present working frequency point is less than or equal to the sum of the minimum interference value and the first preset threshold, maintain the present working frequency point.

* * * * *